United States Patent

Cailbault

[11] Patent Number: 5,125,500
[45] Date of Patent: Jun. 30, 1992

[54] MACHINE FOR THE AUTOMATIC SORTING OF OBJECTS

[76] Inventor: Christian J. G. Cailbault, 57 rue de la Marcelliere, 85430 Le Chateau D'Olonne, France

[21] Appl. No.: 635,555
[22] PCT Filed: Oct. 2, 1989
[86] PCT No.: PCT/FR89/00509
§ 371 Date: Jan. 18, 1991
§ 102(e) Date: Jan. 18, 1991
[87] PCT Pub. No.: WO90/03853
PCT Pub. Date: Apr. 19, 1990

[30] Foreign Application Priority Data
Oct. 4, 1988 [FR] France .................. 88 13241

[51] Int. Cl.$^5$ .............................. B65G 25/00
[52] U.S. Cl. .................. 198/470.1; 198/477.1; 198/803.9
[58] Field of Search .......... 198/470.1, 476.1, 477.1, 198/474.1, 408, 803.9, 803.7

[56] References Cited

U.S. PATENT DOCUMENTS

| 801,523 | 10/1905 | Hinchman et al. | 198/476.1 |
| 1,852,428 | 4/1932 | Marchand et al. | 198/803.8 |
| 3,055,480 | 9/1962 | Hyman | 198/351 |
| 3,399,768 | 9/1968 | Holmberg et al. | 198/476.1 X |
| 4,044,659 | 8/1977 | Bardenhagen et al. | 198/474.1 X |
| 4,201,286 | 5/1980 | Meier | 198/803.7 X |
| 4,567,988 | 2/1986 | Weibel | 209/564 |
| 4,905,818 | 3/1990 | Houseman | 198/470.1 X |
| 4,968,081 | 11/1990 | Beight et al. | 198/470.1 X |

FOREIGN PATENT DOCUMENTS

| 953469 | 12/1949 | France . | |
| 1136552 | 5/1957 | France . | |
| 1425143 | 9/1989 | U.S.S.R. | 198/476.1 |

Primary Examiner—Robert P. Olszewski
Assistant Examiner—Cheryl L. Gastineau
Attorney, Agent, or Firm—Sandler, Greenblum & Bernstein

[57] ABSTRACT

Automatic sorting machine for treating objects of various shapes and sizes. According to the invention, the installation comprises a conveyor-distributor arranged on top of a certain number of reception locations and carrying first object supports forming grippers, and a conveyor-elevator provided with a plurality of second object supports and arranged under the conveyor-distributor in order to present objects to different gripper-forming object supports. The automatic sorting applies especially to the automatic sorting of pockets and small bags.

20 Claims, 4 Drawing Sheets

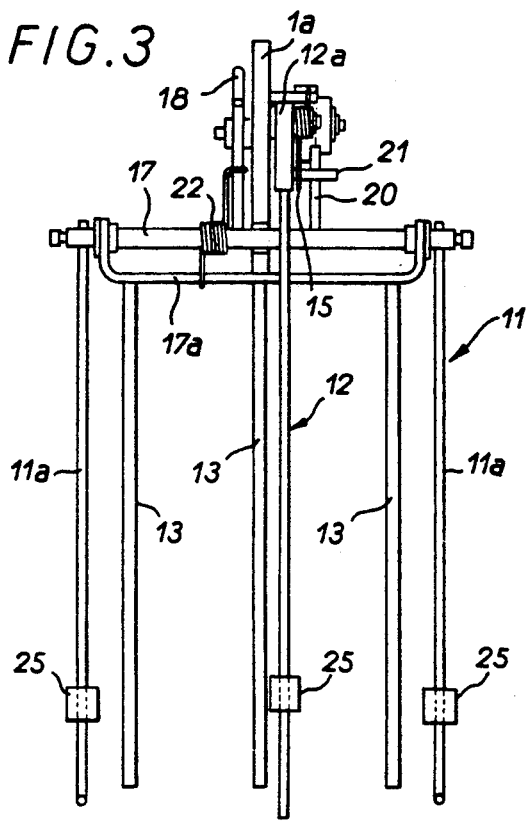
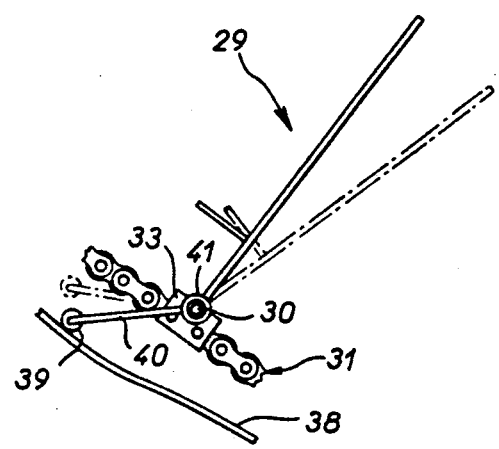

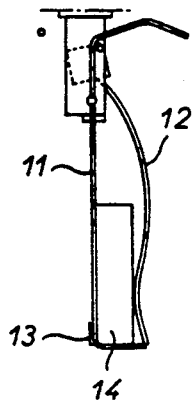 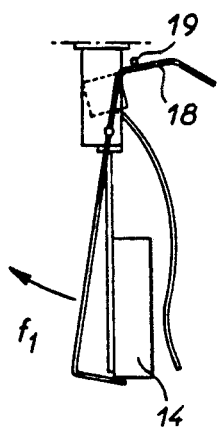 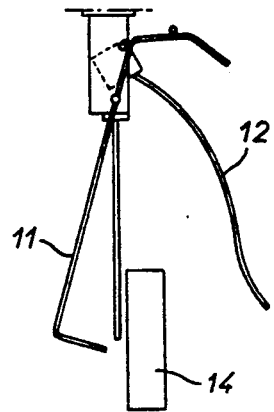 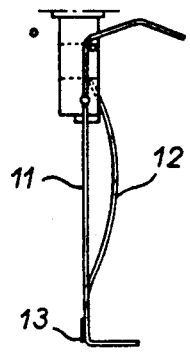
FIG.6  FIG.7  FIG.8  FIG.9
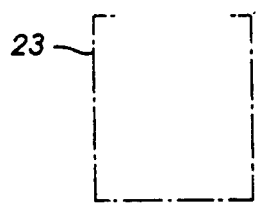
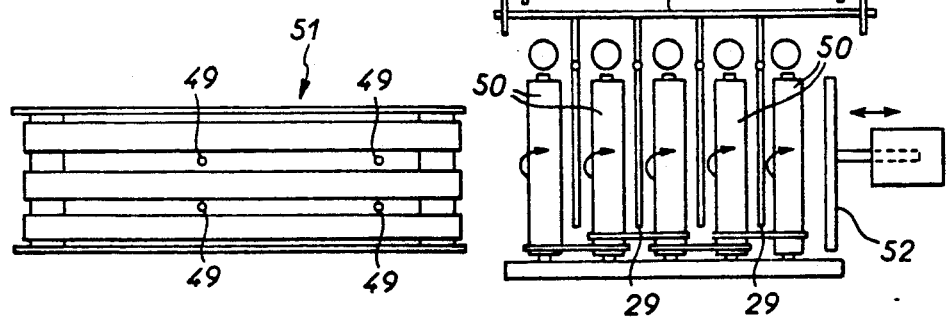
FIG.10
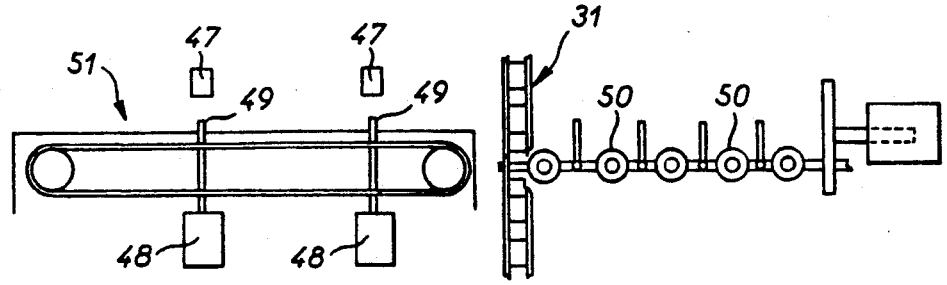
FIG.11

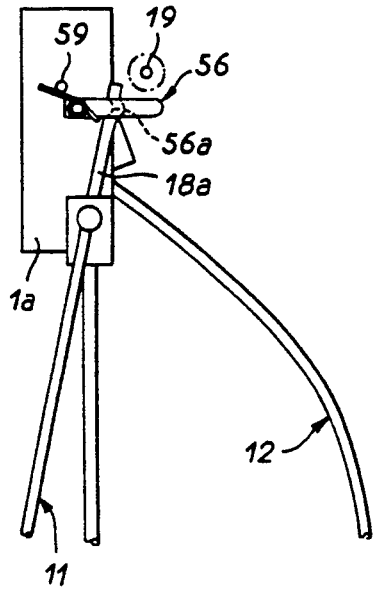
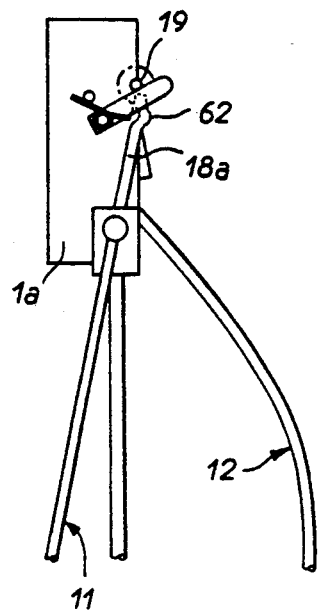
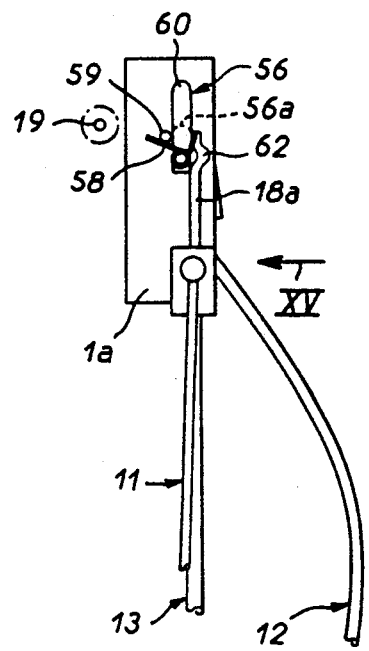
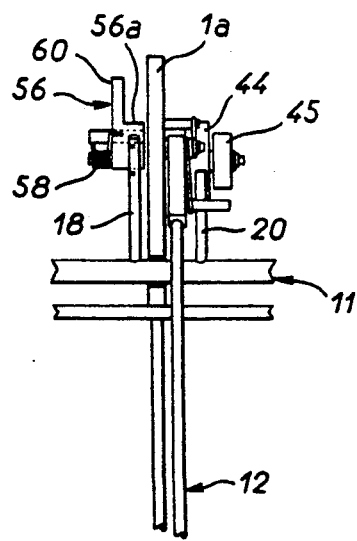

MACHINE FOR THE AUTOMATIC SORTING OF OBJECTS

BACKGROUND OF THE INVENTION

1. Field of the Invention

The invention concerns a machine for the automatic sorting of objects, more particularly designed for treating objects of various shapes and sizes in order to group said objects at specific places, for example to route them subsequently to a corresponding destination or to another machine.

2. Discussion of Background Material

In most cases the objects are identified by bar codes, magnetic codes or markings that can be read by a character recognition system or by other like means. The information is processed by a computer which assigns to the object a destination corresponding to an aforementioned specific place. For example, a machine of this kind may be used to sort packets of photographs in a development laboratory in order to group packets for dispatch to different destinations. It can also be used in pharmaceutical laboratories and in mailing centers handling large quantities of mail, newspapers and packets. Conventionally, a machine of this kind moves the objects on conveyor belts with outlets involving lateral deviation or traps opening on the passage of the objects.

For example, known machines in photograph development centers are able to transport only thin identical standardized packets. These objects are inserted into the machine by allowing the objects to drop onto a conveyor.

SUMMARY OF THE INVENTION

The device in accordance with the invention enables objects of different shapes, volumes and weights to be transported simultaneously without any previous adjustment of the installation. It proposes a new sorting concept using grippers to transport the objects and a loading system in which a conveyor-elevator inserts the objects into the open grippers from below.

To be more precise, the invention therefore concerns a machine for the automatic sorting of objects characterized in that it comprises:

a closed loop conveyor-distributor arranged substantially horizontally above a certain number of reception locations and carrying a plurality of first object support grippers, actuator means for the grippers disposed at a location for loading the objects and at the reception location, and a closed loop conveyor-elevator provided with, a plurality of second object supports arranged below the conveyor-distributor and in the vicinity of the loading location, part of the travel the said conveyor-elevator extending upwards to route the second object supports to the same level as the first object support grippers.

The object supports of the conveyor-elevator are advantageously in the form of forks so that the fingers of a fork can be temporarily interleaved between arms and pins of a gripper (to be described later) and so facilitate transferring the objects from the conveyor-elevator to the conveyor-distributor.

Using this transfer method, the invention makes it possible to transport objects of different shape, volume and weight, for example envelopes, packets, mailing tubes, without any need for adjustment or manual modification of the adjustments of the sorting machine. The mechanical motions of the machine are rotary and continuous, simplifying synchronization which is reliable over a wide range of speeds. An object is inserted into the gripper by the conveyor-elevator which may be installed at ground level or below ground level, which facilitates access from all around the machine.

According to another beneficial feature of the invention, the horizontal component of the displacement of the conveyor-elevator is in the same direction as that of the displacement of the conveyor-distributor. In other words, as it moves upwards the object support of the conveyor-elevator moves in substantially the same direction as and therefore, so to speak, "tracks" the corresponding (temporarily open) object support gripper which, when it closes, grasps the object presented to it. In this way, even if the two conveyors operate at relatively high speeds, the object is taken up by the gripper at a relatively slow speed, resulting in excellent reliability.

BRIEF DESCRIPTION OF THE DRAWINGS

The invention will be better understood and other advantages of the invention will emerge more clearly from the following description of an installation in accordance with the invention given by way of example only and with reference to the appended drawings in which:

FIG. 3 is another view in elevation of a closed and empty gripper of this kind, as seen in the direction of the arrow III in FIG. 1;

FIG. 4 is an elevation view of part of the machine and in particular the conveyor-elevator;

FIG. 5 is a detailed view of an object support of said conveyor-elevator;

FIGS. 6 through 9 are schematic representations of the grippers at various stages of their operation;

FIG. 10 is a schematic plan view of another part of the machine showing in particular transport means feeding the conveyor-elevator;

FIG. 11 is a schematic representation of the same part of the machine as shown in FIG. 10, as seen in the direction of the arrow XI in the latter figure;

FIGS. 12 through 14 show an alternative embodiment of a gripper and how it operates; and FIG. 15 is a view in the direction of the arrow XV in FIG. 12.

DETAILED DESCRIPTION OF THE PREFERRED EMBODIMENTS

Figure 1:
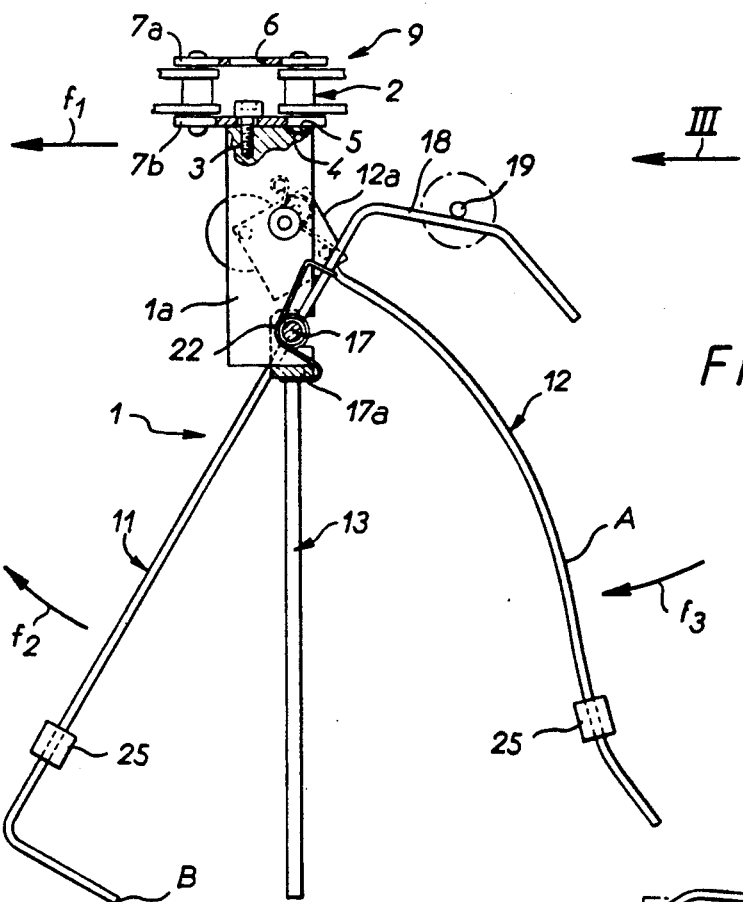
FIG. 1 is a view in elevation of a gripper of the installation shown open above a reception location.
Figure 2:
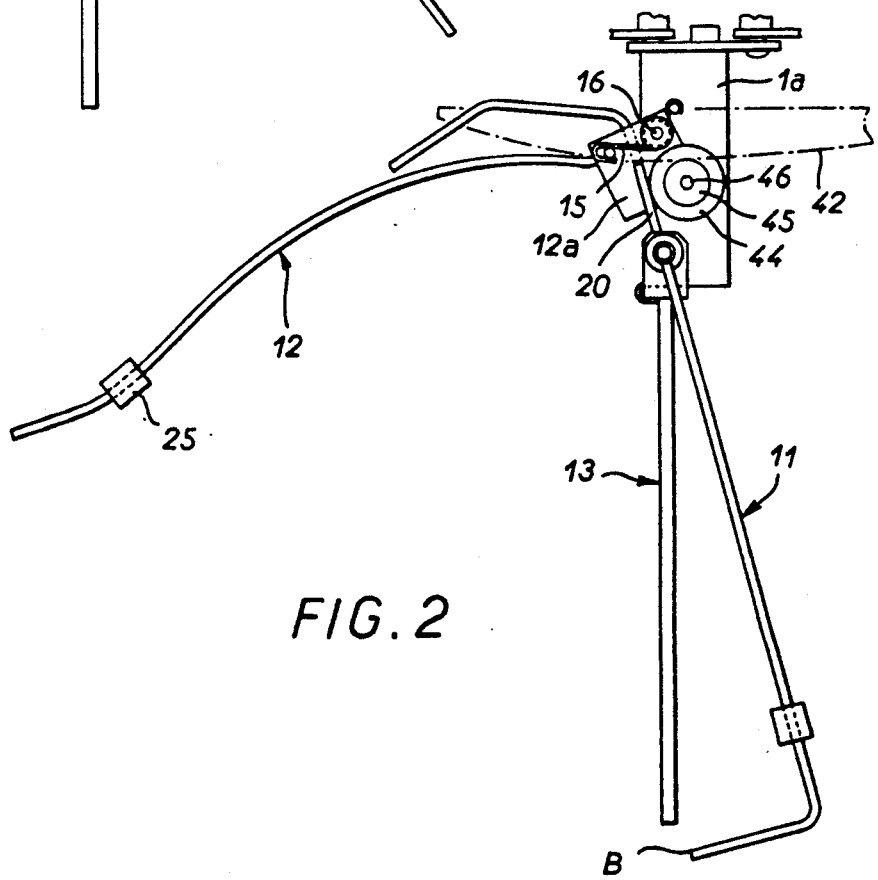
FIG. 2 shows a gripper similar to that from FIG. 1, seen from the other side and shown at a loading location.

Referring to FIGS. 1 through 4 in particular, there are shown the essential parts of the machine for the automatic sorting of objects 14, essentially comprising a closed loop conveyor-distributor 9 provided with first object supports 1 forming grippers, arranged substantially horizontally on top of a certain number of reception locations, and a closed loop conveyor-elevator 10 arranged underneath the conveyor-distributor 9 in the vicinity of a location at which the latter is loaded. The conveyor-distributor comprises second object supports 29. In the embodiment shown the object supports 29 are in the form of forks, as can be seen particularly clearly in FIG. 10.

As shown in FIG. 4, part of the travel of the conveyor-elevator 10 is on a upwards slope to route the second object supports 29 to the same level as the first object support grippers 1.

Means for actuating the object support grippers 1 in the form of a cam 42 are disposed at a loading location and in the form of retractable abutments 19 are disposed at said reception locations. Here each reception location is constituted by a receptacle 23 above which is a controlled retractable abutment 19, at a predetermined location relative to the path of the object supports 1. Each retractable abutment is in the form of a retractable core solenoid, the core forming the retractable abutment. The object support grippers 1 are fixed to a chain 2 constituting the transport means of the conveyor-distributor 9. The chain is arranged substantially horizontally above the reception locations, that is to say above the receptacles 23. The chain 2 carries all of the object support grippers 1.

Each object support 1 comprises a base 1a fixed to the chain 2, a front mobile arm 11 and a rear mobile arm 12, both articulated to the base 1a. It further comprises pins 13 fixed relative to the base 1a and situated in a vertical plane transversely disposed relative to the chain. The pins serve as supports and reference abutments for the object. The base 1a is fixed to a plate 7b of the chain by a single screw 3. A recess 4 at the end of the base receives a rivet head 5 on the chain which enables the base to lie flat against the plate 7b and in particular immobilizes it against rotation relative to the chain, whilst also securing positioning of the base lengthwise of the chain, without requiring any special precautions at assembly time. The tool used to tighten the screw is able to pass through a hole 6 in the other plate 7d, enabling quick demounting and re-assembly of the object support 1. All the top plates 7a of the lengths of the chain have a hole 6 in this way, enabling object supports to be fixed all along the chain with a spacing matched to the insertion system shown in FIG. 4 and to the average size of products to be sorted. The chain 2 and the object supports 1 move in the direction of the arrow f1. The terms "front" and "rear" as applied to the mobile arms 11 and 12, respectively, are to be understood as relating to the direction f1 of movement of the chain. The front mobile arm 11 includes a horizontal shaft 17 rotatably mounted in a yoke 17a fastened to the base 1a and two parallel rods 11a the lower ends of which are bent through 90° like the tines of a rake. The front mobile arm 11 pivots in the direction of the arrow f2 and the rear mobile arm pivots in the direction of the arrow f3.

The two arms 11 and 12 are spring-loaded towards each other and towards the plane of the pins 13. For this purpose the arm 12 is fixed to a flat member 12a pivotably mounted on a shaft 16 of the base 1a and a spiral spring 15 is mounted on the shaft and connected between said base and the flat member in such a way as to urge the arm 12 towards a substantially vertical position. In this way the object 14 is held pressed against the pins 13 by the mobile arm 12. In a similar way, a spiral spring 22 is mounted on the shaft 17 and coupled to the arm and the yoke fastened to the base to urge the arm 11 towards its idle vertical position.

The mobile arm 12 is needed to prevent the object falling backwards on movement, given that the fixed part and in particular the set of pins is in front of the object relative to the direction of displacement. The positioning of the object to the rear of the set of pins 13 makes it possible to release it without propelling it forwards (otherwise than by virtue of its own kinetic energy) whatever the speed of the conveyor-distributor. This arrangement therefore secures great accuracy in controlling the fall of the object.

There will now be described members fastened to the mobile arms 11 and 12 that are shaped and adapted to cooperate with the actuating means 19, 42 described above.

The upper part of the front mobile arm 11, is extended by a bent rod 18 forming a lever and the retractable abutments 19 face towards the path of movement of the bent rod. The rear mobile arm 12 comprises a shaft 46 mounted on the flat member 12a on which is mounted an idler roller 45 adapted to cooperate with the fixed cam 42 at the loading location described above.

In this way, an actuated retractable abutment causes the gripper to open at a selected reception location by direct action on the front arm 11 and the cam 42 opens the same gripper at the loading location by direct action on the rear arm 12. However, the movements of the two arms are linked. The rear mobile arm 12 comprises a transverse auxiliary abutment 21 cooperating with a lever 20 fastened to the front mobile arm (said lever being fixed to the shaft 17 and extending perpendicularly thereto) so that the tilting movement of the front mobile arm tilts the rear mobile arm. The rear mobile arm comprises a roller 44 (or like abutment means) adapted to cooperate with a lever of the mobile front arm, in this instance the same lever 20, so that the tilting movement of the rear mobile arm tilts the front mobile arm. To be more precise, the lever 20 extends between said auxiliary abutment 21 and the roller 44 so that the lever 20 pushes back the auxiliary abutment when the front mobile arm is actuated or is pushed back by the roller 44 when the rear mobile arm is actuated. The roller 44 is an idler roller also mounted on the shaft 46. The diameter of the roller 44 and the idle position of the lever 20 are such that the rear mobile arm can pivot through a certain angle without causing the front mobile arm to pivot.

The lever arm ratio between the shaft 17 and the abutment 21 enables the rear mobile arm 12 to move more quickly than the front mobile arm 11 when the gripper is opened at a release location. Thus the retention of the objects in translation by the rear mobile arm 12 is eliminated before the "gravity" retention of the object 14 is eliminated by disengaging the lower part of the front mobile arm 11. The object 14 is therefore released at the moment at which the end B of the mobile arm 11 is moving in the direction of the arrow F2 and passes beyond the plane of the fixed pins 13. The object is then no longer in contact with the object support and not subjected to any translation force, enabling accurate release of the object at its destination.

The length of the rod 18 depends on the required opening time, the inclination of the end part determining the closing speed.

In one particularly advantageous feature of the invention, the mobile arm 12 includes a curved portion (A) so that a large volume is opened when objects are loaded. A rubber ring 25 is positioned on the mobile arm 12 at the point of contact with the object 14. One or more rubber rings 25 may be provided on the mobile arm 11 to prevent objects sliding laterally, in particular due to centrifugal force when the object support gripper is driven in rotation in the vicinity of the sprocket wheels of the chain, situated at the two ends of the machine.

Multiple mobile arms 11 or 12 may be mounted on the same shafts linked to the base 1a, depending on the length of the object, which in no way modifies the general principle of operation of the machine. Other shapes and profiles of the mobile arms 11 and 12 may be used depending on the shape and the mass of the objects transported, and without departing from the scope of the invention.

FIGS. 6 through 9 show the release of an object above a selected reception location 23, the object support gripper being shown as in FIG. 1 and moving in the direction of the arrow f1. FIG. 6 shows an object 14 held by the mobile arm 11 and the pins 13 in a vertical plane and also by the mobile arm 12. FIG. 7 shows the beginning of the object release phase, when the lever 18 comes into contact with the retractable abutment 19. Note that the rear mobile arm 12 is already no longer in contact with the object 14 whereas the mobile arm 11 is still retaining the object against falling. FIG. 8 shows the object beginning to fall on being released from the support. FIG. 9 shows the object support gripper empty; it will remain in this configuration until it returns to the loading location.

FIGS. 4 through 9 show that, even if driven at high speed, the object drops virtually vertically at the precise moment the mobile arm 11 is disengaged completely, without being thrown forward or entrained by the rear mobile arm. The mobile arms 11 and 12 and the pins 13 are thin metal rods. The distances between their centerlines are chosen to enable the forks 29 of the conveyor-elevator shown in FIG. 4 to pass between the mobile arms 11, 12 and the pins 13 of the object support gripper at the time of loading.

The conveyor-elevator 10 at the loading location will now be described.

The conveyor-elevator 10 comprises a triangular profile frame 26. Said frame is generally dihedron-shaped and each of its three corners carries a rotary bearing 35, 36, 37 supporting a respective toothed sprocket 35a, 36a, 37a on each side of the frame. The six sprockets are keyed "in phase" to their respective bearings and are divided into two groups in two parallel planes, one on each side of the frame. The sprockets of the two groups carry respective chains 31, 32, which are therefore disposed in parallel vertical planes, one on each side of the frame, and constrained to move in said two planes. Each chain therefore has an approximately triangular configuration and the sprockets of the two groups are coaxial in pairs, being fixed to the ends of three bearings carried by the frame. The second object supports 29 forming forks are mounted transversely between the two chains, as shown in FIG. 10. Each support fork comprises a horizontal shaft 30 articulated to plates 33 mounted on the chains 31, 32. In this way the forks are able to tilt relative to the chains and to the frame of the conveyor-elevator. Also, each object support fork comprises a feeler arm 40 and a rail 38 in an approximately triangular closed loop configuration is fastened to the frame and forms a kind of cam. The rail is arranged in a vertical plane, in this instance between the two chains, but it could equally well be on one side of the frame, beyond the chains. Each object support fork 29 comprises at least one spring 41 around the shaft 30 and acting on said object support to maintain contact at all times between the feeler arm 40 and the cam rail 38. The end of the feeler arm 40 carries a roller 39 rolling on said cam rail 38. The predetermined shape of the cam rail 38 determines the inclination of the object support at all points along its travel around the frame. This ensures accurate and rigid inclination of the fork 29 in the direction of operation, while enabling flexible inclination in the opposite direction, by compressing the spring or springs 41, which makes it possible to compensate for any difference of thickness from one object to the next at the time of the transfer between the fork 29 and the object support gripper, at the level of the bearing 36. What is more, the ability of the fork to tilt in the opposite direction to its movement, against the force of the spring 41, prevents damage to the fork or to an object being transported in the event of an incident. The object is taken up by a fork in a horizontal position near the bearing 35. An object is transferred from the object support fork to an object support gripper at the level of the upper bearing 36 with the fork substantially vertical. The gap between the plates 33 by means of which the forks are mounted on the chains of the conveyor-elevator are determined to achieve synchronization with the object support grippers 1. The speed V2 of the chains 31, 32 is calculated according to the angle a between the chain between the bearings 35 and 36 and the horizontal, in order to achieve good synchronization between the rising parts of the two conveyors. This synchronization is achieved by a notched belt 34 determining the necessary speed ratio between the conveyor-elevator and the conveyor-distributor. Also, the length and/or the inclination of each feeler arm 40 is adjustable relative to the remainder of the corresponding object support fork.

FIGS. 10 and 11 show means for transporting objects to the conveyor-elevator and the system for inserting the objects into the forks. The transport means comprise conveyor belts 51 on which the objects are placed, a plurality of parallel rollers 50 cantilevered from a common support and a (preferably adjustable) abutment 52 for immobilizing an object on said rollers. The arrangement is such that the path of the fingers of the object support forks 29 pass between said rollers to grasp the objects.

A reflecting optical barrier 47 senses the presence of an object and commands solenoids 48 which stop the object by means of pins 49 disposed between the conveyor belts. When the object is stopped against the pins 49, the recognition system of the machine determines the destination of the object. The information is stored in a computer which commands the deployment of an abutment 19 corresponding to a reception location when the object passes it.

The admission of the object to the rollers is commanded when a fork 29 is above the rollers 50 at a sufficient distance to enable the object to pass or when a fork is below the rollers 50. The synchronization device commands retraction of the pins 49 and the object is then propelled onto the rollers 50 by the conveyor belts. The rollers 50 are driven from each other by round section belts at the ends at which the roller axles are fixed. The rollers entrain the object and hold it in position against the adjustable abutment 52 until the fork 29 arrives and lifts the object when it is horizontal and then inclines it inwardly to retain it until it is inserted in the gripper 1 when it is vertical. The adjustable abutment 52 is controlled by the object recognition system which determines the position of this abutment in order to center the object correctly on its support. The abutment may be operated by an electrical jack-type actuator.

FIGS. 12 through 15 show an alternative embodiment of the object support gripper enabling said gripper to be held open after the object is released.

In this embodiment the front mobile arm comprises a lever 18a substituted for the bent rod 18. This lever is in lateral contact with a tilting pawl 56 (or any like cam means) pivotally mounted on the base 1a and urged towards an idle, in this instance vertical position by a spring 58. The rest position of the pawl is defined by a peg 59 fixed to the base 1a. Also, the front mobile arm spring-loading means (the spring 22) press the lever 18a against the pawl. An actuator 60 for the latter is adapted to encounter a retractable abutment 19. These abutments face towards the common path of all the elements 60 of the object support grippers.

The lever 18a and the pawl are shaped to define a stable tilted position (FIG. 14) of the front mobile arm. The pawl 56 comprises for this purpose a rounded end 56a which cooperates with a curved part 62 of the lever 18a.

FIGS. 12 through 14 show the operation of this system. A retractable abutment 19 forces the pawl 56 to rotate through approximately 90° and push back the lever 18a, opening the gripper at a reception location. The object is dropped at the chosen location but the pawl remains in its 90° tilted position as its rounded end 56 is locked into the curved portion 62 of the lever (FIG. 14). The gripper therefore remains open during the remainder of its return travel to the loading location. At this location the gripper is opened further by the action of the cam 42 on the roller 45 in a first stage and by the action of the roller 44 on the lever 20 in a second stage. This opening of the gripper releases the pawl which is returned to its stable position by the spring 58. The gripper is then ready to travel again to a reception location selected for the object. This arrangement prevents the object from being grasped again as it is dropped due to the gripper closing too quickly. This makes it possible to increase significantly the speed at which the machine operates.

I claim:

1. Machine for the automatic sorting of objects, comprising:
   a closed loop conveyor-distributor arranged substantially horizontally above a certain number of reception locations and carrying a plurality of first object supports forming grippers, each of said plurality of first object supports comprising a base attached to transport means of the conveyor-distributor, a front mobile arm articulated to said base, and a rear mobile arm articulated to said base;
   actuator means for said plurality of first object supports disposed at one loading location for loading objects and at said reception locations, and members fastened to said front mobile arm and said rear mobile arm being constructed and arranged to cooperate with said actuator means; and
   a closed loop conveyor-elevator comprising a plurality of second object supports arranged below said conveyor-distributor and in the vicinity of said loading location, with said closed loop conveyor-elevator having a portion of its path of travel extending upwards to route said second object supports to a same level as said first object supports.

2. The machine according to claim 1, wherein said second object supports are in the form of forks and are mounted transversely between two chains adapted to move in two parallel vertical planes.

3. The machine according to claim 2, wherein said conveyor-elevator comprises a frame carrying two groups of three sprockets, and sprockets in each group are located in one of said two parallel vertical planes, carrying a corresponding chain to which the sprockets impart an approximately triangular configuration, and corresponding pairs of sprockets of said two groups of three sprockets are coaxial.

4. The machine according to claim 3, wherein each of said plurality of second object supports in the form of a fork is adapted to tilt relative to said conveyor-elevator, and comprises a feeler arm, and wherein said frame comprises a cam rail positioned in a vertical plane, and wherein a spring urges said second object support in a direction enabling said feeler arm to remain in contact with said cam rail so as to determine at all times the inclination of each second object support.

5. The machine according to claim 4, where said conveyor-elevator includes means for transporting the objects, which comprise a plurality of parallel rollers mounted in cantilevered arrangement, and an abutment for immobilizing an object on said rollers, and fingers on said second object support forks having a path that passes between rollers of said plurality of parallel rollers to grasp the objects.

6. The machine according to claim 5, wherein an end of each feeler arm carries a roller in contact with said cam rail.

7. The machine according to claim 6, wherein at least one of a length and an inclination of each feeler arm is adjustable relative to the remainder of a corresponding second object support fork.

8. The machine according to claim 1, wherein said front mobile arm and said rear mobile arm are spring-loaded towards each other.

9. The machine according to claim 8, wherein said transport means comprises a chain arranged substantially horizontally above the reception locations.

10. The machine according to claim 8, wherein each of said first object supports further comprises pins fixed relative to said base and situated in a substantially vertical plane.

11. The machine according to claim 8, wherein said actuator means for said plurality of first object supports comprise retractable abutments, and wherein the actuator means are regulated by mobile core solenoids, and a cam situated at said loading location.

12. The machine according to claim 11, wherein the front mobile arm is extended at its upper end by a bent rod forming a lever, and wherein the abutment is retractable and faces the path of said bent rod.

13. The machine according to claim 11, wherein the front mobile arm comprises an actuator lever in lateral contact with a tilting pawl pivotally mounted to said base and spring-loaded by a spring towards a rest position, wherein said retractable abutments face the path of an actuator member of said pawl, and wherein said actuator lever and said pawl are shaped to define a stable tilted position of said front mobile arm.

14. The machine according to claim 13, wherein said actuator lever comprises a curved part cooperating with a rounded end of said pawl.

15. The machine according to claim 11, wherein said rear mobile arm carries a roller adapted to cooperate with a cam at said loading location.

16. The machine according to claim 8, wherein said rear mobile arm comprises an auxiliary abutment cooperating with said front mobile arm so that tilting of said front mobile arm causes tilting of said rear mobile arm.

17. The machine according to claim 16, wherein said rear mobile arm carries a roller adapted to cooperate with a lever of said front mobile arm so that tilting of said rear mobile arm causes tilting of said front mobile arm.

18. The machine according to claim 17, wherein said front mobile arm comprises a lever extending between said auxiliary abutment and said roller so as to be adapted to push back said auxiliary abutment or to be pushed back by said roller.

19. The machine according to claim 9, wherein said base is fixed by a screw to said chain, and said base further comprises a recess for receiving a rivet head on said chain to immobilize a corresponding first object support against rotation relative to said chain.

20. The machine according to claim 1, wherein a horizontal component of displacement of said conveyor-elevator is in a same direction as that of a displacement of said conveyor-distributor.

* * * * *